США009698894B2

(12) United States Patent
Hirsch et al.

(10) Patent No.: US 9,698,894 B2
(45) Date of Patent: Jul. 4, 2017

(54) BROADBAND MULTI-BEAM SATELLITE RADIOCOMMUNICATION SYSTEM CONFIGURED FOR IMPROVED FREQUENCY RE-USE AND IMPROVED FREQUENCY RE-USE METHOD

(71) Applicant: THALES, Courbevoie (FR)

(72) Inventors: Antonin Hirsch, Cannes la Bocca (FR); Erwan Corbel, Cannes la Bocca (FR); Jean-Michel Mateus, Cannes la Bocca (FR); Régis Lenormand, Cannes la Bocca (FR); Olivier Maillet, Cannes la Bocca (FR)

(73) Assignee: THALES, Courbevoie (FR)

( * ) Notice: Subject to any disclaimer, the term of this patent is extended or adjusted under 35 U.S.C. 154(b) by 133 days.

(21) Appl. No.: 14/935,236

(22) Filed: Nov. 6, 2015

(65) Prior Publication Data

US 2016/0134359 A1    May 12, 2016

(30) Foreign Application Priority Data

Nov. 7, 2014    (FR) ..................................... 14 02535

(51) Int. Cl.
| | |
|---|---|
| *H04B 7/204* | (2006.01) |
| *H04B 7/185* | (2006.01) |
| *H04B 7/208* | (2006.01) |
| *H04W 72/04* | (2009.01) |
| *H04W 72/12* | (2009.01) |
| *H04W 84/06* | (2009.01) |

(52) U.S. Cl.
CPC ......... *H04B 7/18515* (2013.01); *H04B 7/208* (2013.01); *H04B 7/2041* (2013.01); *H04W 72/046* (2013.01); *H04W 72/0453* (2013.01); *H04W 72/1284* (2013.01); *H04W 84/06* (2013.01)

(58) Field of Classification Search
CPC ... H04B 7/18515; H04B 7/2014; H04B 7/208
USPC ........................................................ 370/319
See application file for complete search history.

(56) References Cited

U.S. PATENT DOCUMENTS

2011/0053628 A1    3/2011    Kim et al.
2011/0149837 A1    6/2011    Kim et al.

OTHER PUBLICATIONS

O. Vidal et al., "Fractional Frequency Reuse in fixed Broadband High Throughput Satellite Systems," Proceedings of 31st AIAA International Communication Satellite Systems Conference, Italy, Oct. 14-17, 2013.

(Continued)

*Primary Examiner* — Samina Choudhry
(74) *Attorney, Agent, or Firm* — Baker & Hostetler LLP

(57) ABSTRACT

A broadband multi-beam satellite radiocommunication system configured to implement a scheme for re-use of frequencies from a total band allocated to an uplink comprises a satellite with a multi-beam receive antenna that forms adjacent reception spots of a terrestrial coverage. Each reception spot consists of a central inner zone and a peripheral zone. Each central inner zone is a cellular pattern identical except for a scale factor to geographical cells wherein the principal frequency sub-bands of a bundle of separate or adjacent principal sub-bands are unitarily distributed and the combination of which is equal to a principal band, included in the total band.

17 Claims, 6 Drawing Sheets

(56) References Cited

OTHER PUBLICATIONS

F. Meng et al., "Comparison of Frequency Reuse Schemes in OFDMA based Multi-beam Satellite Communications," Proceedings of 29th AIAA International Communications Satellite Systems Conference, Japan, Nov. 28-Dec. 1, 2011.
Ui Yi Ng et al., "Interference coordination for the return link of a multibeam satellite system," 2014 7th Advanced Satellite Multimedia Systems Conference and the 13th Signal Processing for Space Communications Workshop, Sep. 8, 2014, pp. 366-373. XP032668136.

BROADBAND MULTI-BEAM SATELLITE RADIOCOMMUNICATION SYSTEM CONFIGURED FOR IMPROVED FREQUENCY RE-USE AND IMPROVED FREQUENCY RE-USE METHOD

CROSS-REFERENCE TO RELATED APPLICATIONS

This application claims priority to foreign French patent application No. FR 1402535, filed on Nov. 7, 2014, the disclosure of which is incorporated by reference in its entirety.

FIELD OF THE INVENTION

The present invention concerns a broadband multi-beam satellite radiocommunication system of high capacity, configured for fractional or complete re-use of frequencies on an uplink and a corresponding improved method of frequency re-use.

BACKGROUND

Current high bit rate second generation radiocommunication satellites operating in the Ka band offer high transmission capacities, of the order of around one hundred Gbps, thanks to the use of narrow antenna beams, combined with spatial re-use of the frequency resources in a fixed broadband system and thanks to an efficient strategy for adaptive coding and modulation of the transmission channels.

Of the standard frequency re-use schemes, the scheme that corresponds to an allocation of four distinct sub-bands across all of the coverage spots of the multi-beam antenna in accordance with a pattern with four colours is well known. A 4-FR frequency re-use scheme employing four colours divides the whole of the band allocated to the system into four distinct sub-bands of frequencies or four colours, and allows adjacent beams of the satellite transmit or receive antenna to transmit in the various sub-bands on a downlink from the satellite to the ground or to receive in the various sub-bands on an uplink from the ground to the satellite. A 4-FR frequency re-use scheme employing four colours enables use of a constant minimum distance between beams of the same colour and consequently a reasonable compromise to be obtained between the re-use factor of the band and the isolation between the beams.

However, with a fixed number of beams of a geographical coverage, if it is wished to reduce the number of colours, the C/I of frequency re-use determined by the distance between two spots of the same colour is reduced, which reduces spectral efficiency and limits or even prevents any increase in the communication capacity of the system.

To improve the total capacity of the system in a downlink context, i.e. in the transmission spots of the satellite antenna, the paper by O. Vidal et al., entitled "Fractional Frequency Reuse in fixed Broadband High Throughput Satellite systems" published in Proceedings of 31st AIAA International Communication Satellite Systems Conference, Oct. 14-17, 2013, Florence, Italy, describes a solution that increases the bandwidth used per spot for each of the spots of a coverage. This solution exploits fractional frequency re-use (FFR) schemes that are used in terrestrial mobile networks such as WiMAX and LTE networks. The FFR technique applied in a satellite radiocommunication system in the context of the downlink is a frequency re-use technique that covers the standard patterns of colours, i.e. three, four, seven, twelve colours, for example, combining them with more dense frequency re-use schemes within each beam. The paper by O. Vidal describes with no limitation of its general applicability a classic 7-FR re-use scheme employing seven colours combined with a 1-FR scheme of total re-use of one sub-band. In this configuration, the sub-band F0 of the 1-FR scheme and the sub-bands Fi of the 7-FR scheme are in permanent use in their allocation beams but anywhere within the coverage and the ratio C/I observed in the sub-band Fi will be greater than the ratio C/I observed in the sub-band F0 because of a lower re-use factor for the sub-band F0.

To improve the total capacity of the system and in an uplink context, i.e. in the reception spots of the satellite antenna, the paper by F. Meng et al., entitled "Comparison of Frequency Reuse Schemes in OFDMA based Multi-beam Satellite Communications" published in Proceedings of 29th AIAA International Communications Satellite Systems Conference, 28 Nov.-1 Dec. 2011 Nara, Japan describes a solution that increases the bandwidth used per reception spot for each of the reception spots of a coverage in the form of a first configuration and a second configuration.

In the first configuration, a common frequency sub-band is allocated in an inner zone of each spot in accordance with a 1-FR scheme of total re-use of a sub-band, and in combination therewith a classic 3-FR three-colour re-use scheme applied to different sub-bands of the common sub-band is used for the peripheral zones of the reception spots, each peripheral spot having a peripheral zone surrounding its inner zone. Note that this sharing of resources on the uplink between an inner zone and a peripheral zone for each reception spot is made possible by virtue of a geo-location functionality installed in each user terminal enabling it to determine in which spot and in which zone it is located (the inner zone or the peripheral zone).

The second configuration is identical to the first configuration except that, for a given reception spot, not only is the band common to all the spots allocated to its inner zone, but also it is allocated the sub-bands of the peripheral zones of the adjacent spots.

Although the two configurations described make it possible to increase the capacity of the system, this increase remains limited, when the size of the inner zones and of the common sub-band increases, because of the interference generated by the inner zones of the adjacent spots.

SUMMARY OF THE INVENTION

The technical problem is to increase the satellite capacity or the capacity density on the uplink of a multi-beam satellite radiocommunication system that uses a fractional frequency re-use (FFR) scheme or a complete frequency re-use scheme in accordance with which a sub-band common to all the reception spots is allocated to the inner zone of each reception spot.

In particular, the technical problem is to increase the area of the inner zone of each reception spot without increasing the signal to interference ratio C/I or to increase the signal to interference ratio C/I for an area of the inner zone of each reception spot.

To this end, the invention consists in a broadband multi-beam satellite radiocommunication system configured for complete or fractional re-use of frequencies from a total band BT allocated to an uplink, including:

a satellite having a multi-beam receive antenna configured to form a set of at least two adjacent reception spots of a terrestrial coverage; and a set of transmitter terminals distributed across all of the spots, each terminal including geographical positioning means and means for transmission of an allocated transmission resource;

an uplink transmission resource scheduler and allocator, taking the form of one or more electronic computers, configured to allocate a transmitter terminal on demand an uplink transmission resource in terms of a frequency subband as a function of the geographical position of the transmitter terminal and a transmission resource allocation plan in accordance with which each reception spot consists of a central inner zone and a peripheral zone surrounding the central inner zone; and the same continuous or discontinuous principal band BP of frequencies, forming a part or the whole of the total band, is allocated in its entirety to each central inner zone, characterized in that in accordance with the transmission resource allocation plan, the principal band BP is divided into a first bundle comprising a first whole number n1, greater than or equal to 2, of adjacent or separate principal sub-bands each of which is continuous; and the central inner zone of each reception spot is divided, except for a scale factor representative of the size of the central inner zone, into the same regular cellular pattern of cells in which the various principal sub-bands of the first bundle are unitarily distributed, the number of cells of the cellular pattern being equal to the first number n1 of principal sub-bands of the first bundle.

In accordance with particular embodiments, the satellite radiocommunication system has one or more of the following features:

in accordance with the transmission resource allocation plan the principal band BP of frequencies forms a part of the total band; and the frequencies of the total band BT that are not part of the principal band BP form a continuous or discontinuous secondary band BS that is divided into a second bundle comprising a whole number n2, greater than or equal to 3, of separate or adjacent secondary sub-bands each of which is continuous, distributed across all of the peripheral zones of the reception spots in accordance with a multicolour scheme with n2 secondary sub-band colours;

the second number n2 of secondary sub-bands is a whole number included in the set of numbers 3, 4, 7 and 12;

the cellular pattern is a pattern of cells of the same size and of triangular, square or hexagonal shape and/or the number n1 of cells is between 2 and 19 inclusive;

the uplink transmission resource scheduler and allocator is configured to allocate a transmitter terminal on demand an uplink transmission resource in terms of a frequency subband and a polarization as a function of the geographical position of the transmitter terminal and the resource allocation plan in accordance with which, a third whole number n3, greater than or equal to 2, of different polarizations forming a set of polarization states, are distributed across all of the reception spots and are superposed in accordance with a multicoloured distribution scheme with n3 polarization colours on the coloured geographical allocation map of the sub-bands of frequencies;

the third number n3 of polarizations is equal to 2 and the polarizations of the pair are the left circular polarization and the right circular polarization or a first polarization with respect to a first axis and a second polarization with respect to a second axis orthogonal to the first axis;

the receive antenna is configured to form reception spots each illuminated in accordance with a Gaussian law and each having at its edge a roll-off greater than or equal to 7 dB;

the satellite radiocommunication system further includes an automatic system for correction of the depointing of the antenna notably caused by variations of attitude of the platform;

the satellite radiocommunication system further includes a set of transmitter terminals distributed across all of the spots, and each terminal includes geographical positioning means sufficiently precise to determine in which spot it is located, if it is located in an inner zone or in a peripheral zone, and when it is located in an inner zone in which cell it is located;

the uplink transmission resource scheduler and allocator is distributed across all of the terminals and/or one or more auxiliary stations or is centralized in a station for controlling the resources and their scheduling;

the size of the central zone, representative of the scale factor, varies as a function of the reception spot and time, or the size of the central zone varies as a function of the reception spot and is independent of time, or the size of the central zone is constant independently of the reception spot and time;

the satellite radiocommunication system is configured for reception of the uplink by the satellite in a band included in the set of bands C, X, Ku, Ka, L, S, Q and V;

The invention also consists in a method of complete or fractional re-use of frequencies of a total band allocated to an uplink in a broadband multi-beam satellite radiocommunication system, the system including:

a satellite having a multi-beam receive antenna configured to form a set of at least two adjacent reception spots of a terrestrial coverage; and a set of transmitter terminals distributed across all of the spots, each terminal including geographical positioning means;

the method including the steps consisting in geographically dividing each reception spot into a central inner zone and a peripheral zone surrounding the central inner zone; then allocating the inner zones of all the reception spots a continuous or discontinuous principal sub-band of frequencies forming a part or the whole of the total band, characterized in that the method further includes the steps consisting in:

dividing the principal band into a first bundle of a first number n1 greater than or equal to 2 of adjacent or separate principal sub-bands each of which is continuous; and dividing each central inner zone of a reception spot, except for a scale factor representative of the size of the inner zone, into the same cellular pattern of cells in which the various principal sub-bands of the first bundle are unitarily distributed, the number of cells of the cellular pattern being equal to the first number n1 of secondary sub-bands of the first bundle.

In accordance with particular embodiments, the complete or fractional frequency re-use method has one or more of the following features:

the method further includes the steps consisting in, for each terminal requiring a transmission resource, determining in which spot the terminal is located and if it is located in an inner zone or in a peripheral zone, and determining in which cell it is located if the terminal is located in an inner zone, and in this case allocating the terminal the sub-band that has been allocated to the cell of the reception spot in which the terminal is located;

the principal band of frequencies forms a part of the total band and the method further includes the steps consisting in dividing the frequencies of the total band that are not part of the principal band into a second bundle comprising a number n2 greater than or equal to 3 of separate or adjacent continuous secondary sub-bands distributed across all of the peripheral zones in accordance with a multicolour scheme with n2 secondary sub-band colours; and for each terminal requiring a transmission resource, after determining in which spot it is located and if it is located in an inner or peripheral zone, if the terminal is located in a peripheral zone, allocating the terminal the auxiliary sub-band that has been allocated to the peripheral zone of the reception spot in which the terminal is located;

the method further includes the steps consisting in distributing across all of the reception spots a third whole number n3, greater than or equal to 2, of polarizations forming a set of polarization states, superposing sub-bands on the geographical allocation map in accordance with a multicolour distribution scheme with n3 polarization colours; and for each terminal requiring a transmission resource formed of a frequency sub-band and a polarization, after determining in which reception spot it is located, allocating the terminal the polarization that has been allocated to the reception spot in which the terminal is located, in addition to the sub-band that has been allocated to it;

the size of the central zone varies as a function of the spot and time, or the size of the central zone varies as a function of the reception spot and is independent of time, or the size of the central zone is constant independently of the reception spot and time.

BRIEF DESCRIPTION OF THE DRAWINGS

The invention will be better understood on reading the following description of a number of embodiments, given by way of example only and with reference to the drawings, in which.

DETAILED DESCRIPTION

Figure 1:
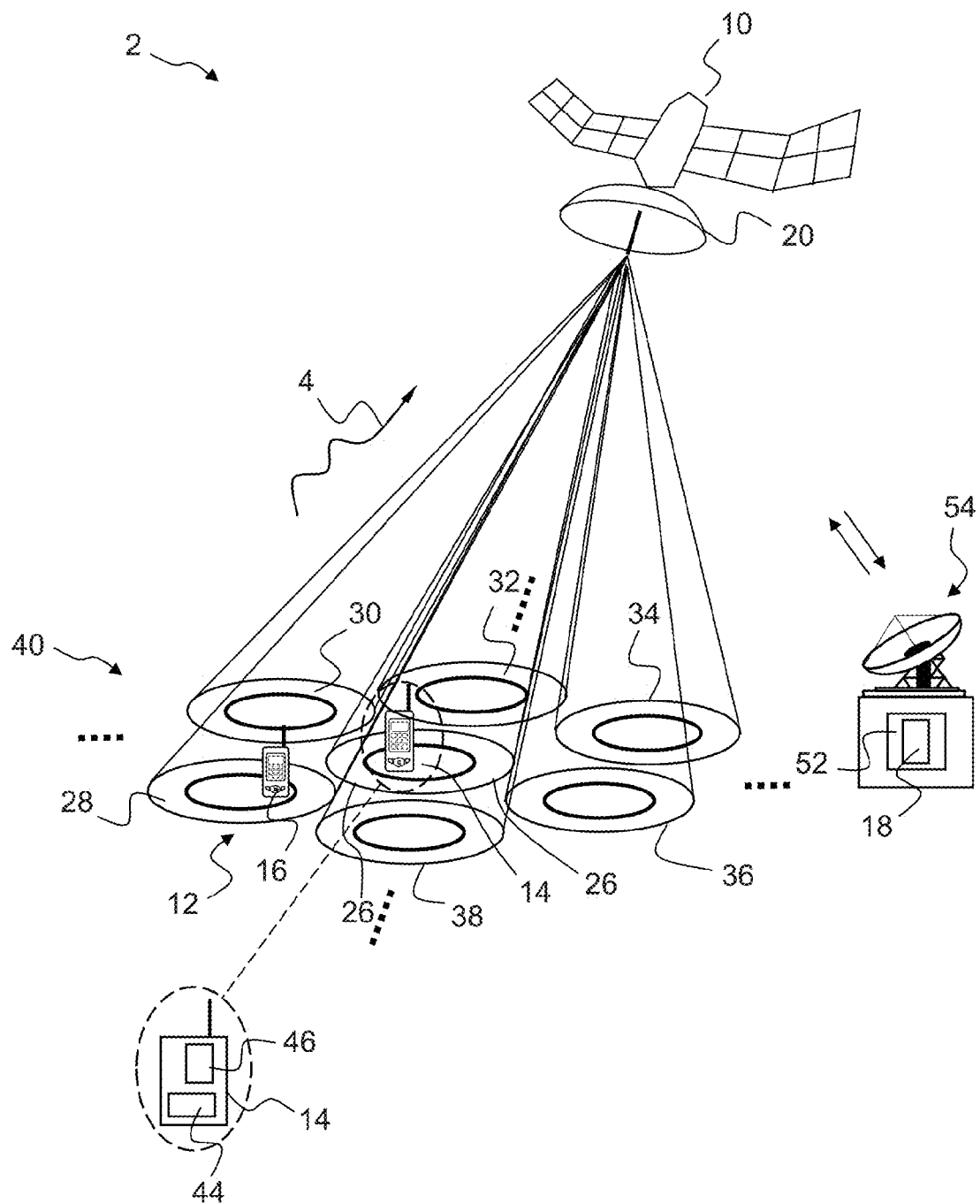
FIG. 1 shows a satellite radiocommunication system configured for frequency-use in accordance with the invention.

As shown in FIG. 1, a broadband multi-beam satellite radiocommunication system 2 is configured to implement complete or fractional re-use of frequencies from a total band BT allocated to an uplink 4.

The satellite radiocommunication system 2 includes a satellite 10, a set 12 of transmitter terminals 14, 16, and an uplink transmission resource scheduler and allocator 18.

The satellite 10 includes a multi-beam receive antenna 20 configured to form a set 24 of at least two adjacent reception spots 26, 28, 30, 32, 34, 36, 38 of a terrestrial coverage 40.

As shown in FIG. 1 by way of illustrative example, the set 24 of reception spots of the terrestrial coverage 40 comprises seven reception spots 26, 28, 30, 32, 34, 36, 38 with a central reception spot 26 surrounded by six immediately adjacent reception spots 28, 30, 32, 34, 36, 38, this disposition defining a classic hexagonal grid pattern of a satellite coverage for spots of substantially circular shape.

The transmitter terminals 14, 16 of the set 12, only two of which are shown in FIG. 1 for simplicity, are distributed across the set 24 of reception spots, here the central spot 26 and the adjacent spot 28, each terminal including geographical positioning means or geo-location means 44 and means 46 for transmitting an allocated uplink transmission resource.

The uplink transmission resource scheduler and allocator 18, produced in the form of one or more electronic computers 52, is configured to allocate a transmitter terminal, for example the transmitter terminal 14, on demand an uplink transmission resource, generally a frequency sub-band, as a function of the geographical position of the transmitter terminal, determined by the geographical positioning means 44, and a transmission resource allocation plan that completely or fractionally re-uses the frequencies from the total band BT allocated to the uplink 4.

Here the uplink transmission resource scheduler and allocator 18 is centralized in a station 54 for controlling the resources and their scheduling.

Alternatively, the uplink transmission resource scheduler and allocator is distributed across all of the terminals and/or one or more auxiliary stations.

Figure 2:
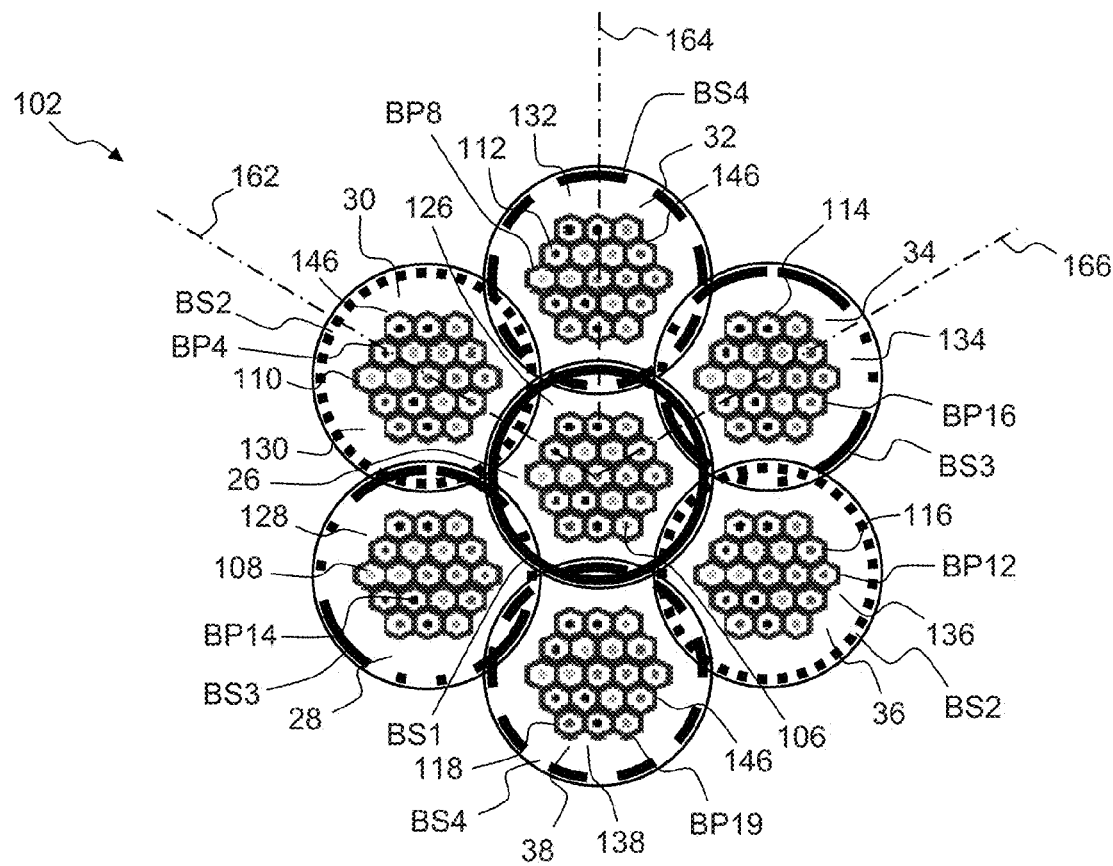
FIG. 2 shows a geographical frequency re-use scheme in accordance with a first embodiment of the invention without re-use of polarization states.

As shown in FIG. 2 and in accordance with a frequency re-use plan 102 in accordance with a first embodiment of the invention, a partial view of this plan 102 for the uplink is represented by the set 24 of reception spots 26, 28, 30, 32, 34, 36, 38 shown in FIG. 1.

In accordance with the plan 102, each reception spot 26, 28, 30, 32, 34, 36, 38 consists of a respective central inner zone 106, 108, 110, 112, 114, 116, 118 and a peripheral zone 126, 128, 130, 132, 134, 136, 138 surrounding the corresponding central inner zone.

Figure 3:
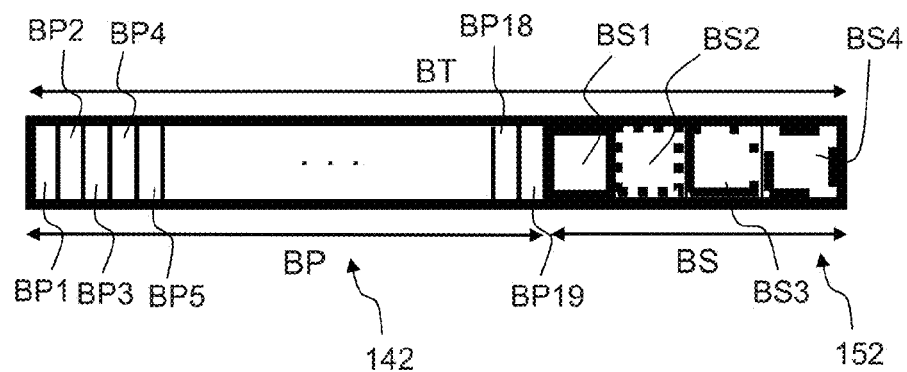
FIG. 3 shows a frequency plan associated with the FIG. 2 frequency re-use scheme.

In accordance with the transmission resource allocation plan 102 shown in FIGS. 2 and 3, the same principal band BP of frequencies, here continuous and forming a part of the total band BT, is allocated in its entirety to each central inner zone 106, 108, 110, 112, 114, 116, 118.

As shown in FIG. 3, the principal band BP is divided into a first bundle 142 comprising a first whole number n1, here equal to 19, of principal sub-bands numbered successively from BP1 to BP19, each of which is continuous and that are adjacent two by two.

As shown in FIG. 2, the central inner zone 106, 108, 110, 112, 114, 116, 118 of each reception spot 26, 28, 30, 32, 34, 36, 38 is divided, here by the same scale factor K representative of the size of the inner zone of the reception spot, into the same compact, continuous and regular cellular pattern 146 covering the entirety of the central zone and comprising 19 hexagonal cells in which the various principal sub-bands of the first bundle 142 are unitarily distributed. The number of cells in the cellular pattern 146 is therefore equal to the number of principal sub-bands of the first bundle and there is a one-to-one correspondence between the principal sub-bands and the hexagonal cells of the cellular pattern 146. For example, numbering the cells from 1 to 19 and considering the rows of the pattern from top to bottom and the cells of each row from left to right, here each cell is allocated the principal sub-band whose rank in the principal band is equal to the number of the cell. The principal sub-bands BP1, BP2, BP3 are therefore respectively allocated to the three cells of the first row at the top of the pattern 146, numbered 1, 2, 3 from left to right in the first row in FIG. 2. Similarly, the principal sub-bands BP4, BP5, BP6 and BP7 are respectively allocated to the four cells of the second row from the top of the pattern, numbered 4, 5, 6, 7 from left to right in the second row in FIG. 2, and so on for the five cells numbered 8, 9, 10, 11, 12 of the third row, the four cells numbered 13, 14, 15, 16 of the fourth row, and the three cells numbered 17, 18, 19 of the fifth and final row.

Note that a function of correspondence between the numbers of the cells and the ranks of the principal sub-bands derived from the correspondence function described above by permutating the numbers of the cells and/or the ranks of the principal sub-bands defines another pattern that is suitable for the invention.

In accordance with the FIG. 3 transmission resource allocation plan 102, the principal band BP of frequencies here forms a part of the uplink reception total band BT. The frequencies from the total band BT that are not part of the principal band BP form a secondary band BS, which here is continuous and is divided into a second bundle 152 comprising a whole number n2, here equal to 4, of secondary sub-bands numbered successively BS1, BS2, BS3, and BS4, each of which is continuous and that are adjacent two by two.

As shown in FIG. 2, the sub-bands BS1, BS2, BS3 and BS4 are distributed across all of the peripheral zones 126, 128, 130, 132, 134, 136, 138 of the reception spots 26, 28, 30, 32, 34, 36, 38 in accordance with a multicolour scheme, here with four secondary sub-band colours. The secondary sub-band BS1 is allocated to the central reception spot 26, the secondary sub-band BS2 is allocated to the two spots 30 and 36 adjacent and on respective opposite sides of the central spot 26 and located along a first axis 162 passing through the centre of the central spot 26 and of negative slope in FIG. 2, the secondary sub-band BS3 is allocated to the two spots 32 and 38 adjacent and on respective opposite sides of the central spot 26 and located along a vertical second axis 164 passing through the centre of the central spot 26, the secondary sub-band BS4 is allocated to the two spots 34 and 28 adjacent and on respective opposite sides of the central spot 26 and located along a third axis 166 passing through the centre of the central spot 26 and having the opposite slope to the slope of the first axis 162. The reception spots 26, 28, 30, 32 with associated their secondary sub-band colours form a colour meshing of all the peripheral zones of the reception spots for the four-colour secondary sub-band scheme described above.

Alternatively, the principal band BP of frequencies forms the whole of the total band BT, which is continuous, and this band is allocated in its entirety to each central inner zone. In this case no secondary sub-band colouring is used in the peripheral zones of the reception spots.

The same continuous or discontinuous principal band of frequencies forming a part of or the whole of the total band is generally allocated in its entirety to each central inner zone.

The principal band is generally divided into a first bundle comprising a first whole number n1, greater than or equal to 2, of adjacent or separate principal sub-bands each of which is continuous.

The central inner zone of each reception spot is generally divided, except for a scale factor representative of the size of the inner zone, into the same regular cellular pattern of cells in which the various principal sub-bands of the first bundle are unitarily distributed, the number of cells of the cellular pattern being equal to the first number n1 of principal sub-bands of the first bundle.

The cellular pattern is preferably a pattern of cells of the same size and of triangular, square or hexagonal shape and/or the number of cells is preferably between 2 and 19 inclusive.

In accordance with the transmission resource allocation plan, when the principal band of frequencies forms a part of the total band, the frequencies of the total band that do not form part of the principal sub-band generally form a continuous or discontinuous secondary band that is divided into a second bundle comprising a whole number n2, greater than or equal to 3, of separate or adjacent secondary sub-bands each of which is continuous, distributed across all of the peripheral zones of the reception spots in accordance with a multicolour scheme with n2 secondary sub-band colours.

The second number n2 of secondary sub-bands is preferably a whole number in the set of numbers 3, 4, 7 and 12.

Figure 4:
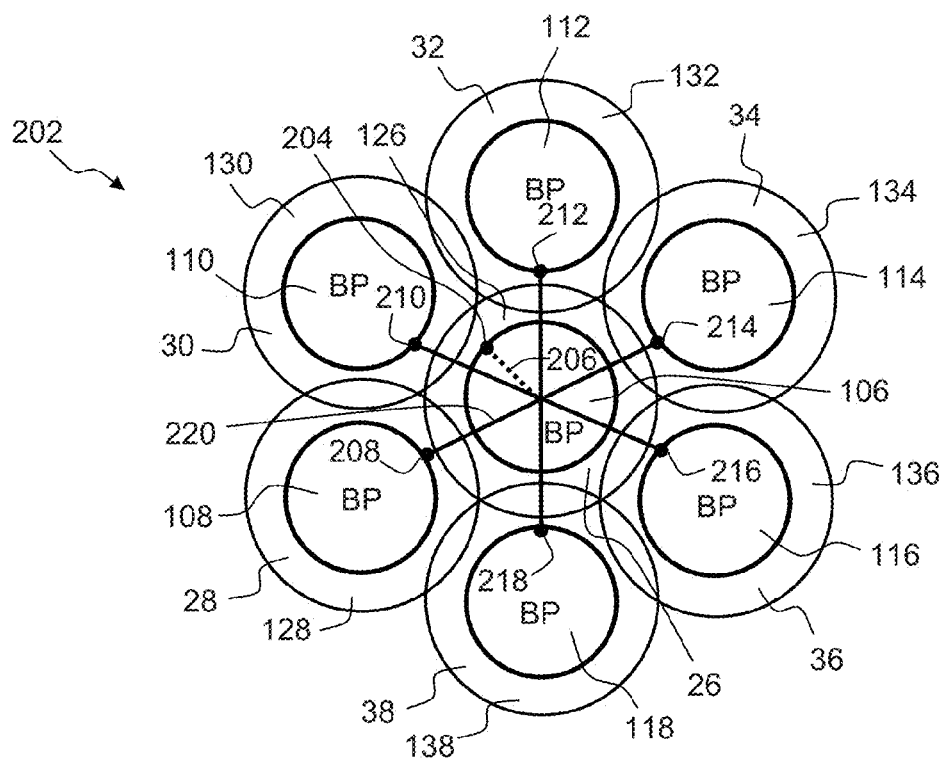
FIG. 4 shows a first prior art geographical frequency re-use scheme without re-use of polarization states serving as first reference in the evaluation of the transmission performance of a frequency re-use scheme in accordance with the invention.

FIG. 4 shows a reference configuration of a prior art resource allocation plan 202 in order to highlight the improvement in the transmission capacity conferred on the system by the use of the FIG. 2 frequency re-use plan 102.

The reference transmission resource allocation plan 202 differs from the FIG. 2 frequency re-use plan 102 only in the absence of a cellular pattern with at least two cells, a fortiori 19 non-continuous allocation cells of the principal band. Note that the four-colour secondary sub-bands scheme is used in the reference allocation plan 202 but is not shown here for reasons of the legibility of FIG. 4.

In accordance with the reference allocation plan 202 with no cellular sectorization, any frequency or sub-band of frequencies of the principal band BP may be used anywhere in the central inner zone of each reception spot, and in particular may be used anywhere in the interior border of the central inner zone of each reception spot, which is the opposite of the allocation plan 102 of the invention, in accordance with which the use of a principal sub-band is constrained by the cellular pattern of allocation of the principal sub-bands implemented in each central inner zone of the reception spots.

As shown in FIG. 4, the worst case ratio C/I for the allocation plan 202 is observed when the required payload signal is transmitted from a first terminal located at the edge of the inner zone of the central reception spot and at the end 204 of a first directivity segment 206 in FIG. 4, for example, and the interference signal results from the contribution of six dominant interference sources, consisting of six terminals transmitting the same frequency and located at the edges of the central zones of the adjacent reception spots at the ends 208, 210, 212, 214, 216, 218 of six directivity segments forming a star 220 with six branches. This worst case C/I is the reference C/I, $(C/I)_{refl}$, that the aim is to improve.

Figure 5:
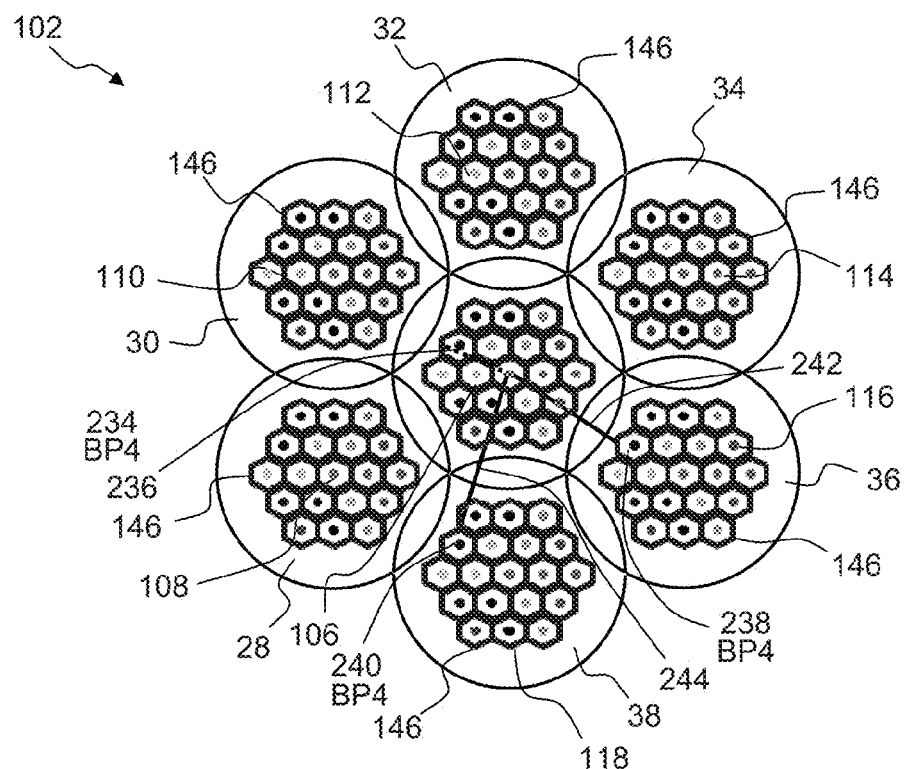
FIG. 5 shows a worst case configuration in terms of C/I observed in the case of use of the FIG. 2 frequency re-use scheme.

In FIG. 5, the frequency re-use plan 102 in accordance with the first embodiment of the invention is represented in exactly the same manner as in FIG. 2 except that the four-colour secondary sub-band scheme is not shown here for reasons of the legibility of FIG. 5.

In accordance with the frequency re-use plan 102, the use of any principal sub-band BP1, BP2, . . . , BP19 of the principal band BP is constrained by the cellular pattern 146 of allocation of the principal sub-bands implemented in each central inner zone of the reception spots being limited to only one cell per reception spot.

As shown in FIG. 5, the worst case ratio C/I for the frequency re-use plan 102 in accordance with the invention is observed when the required payload signal is transmitted from a second terminal located at the edge of the inner zone 106 of the central reception spot 26 and at the end 234 of a first directivity segment 236, for example, and the interference signal results for the most part from the contribution of two dominant interference sources consisting of two terminals transmitting the same frequency, here the sub-band BP4, and located at the edges of the central zones 116, 118 of the two adjacent reception spots 36, 38 at the ends 238, 240 of two directivity segments 242, 244. This worst case C/I is 5 dB higher than the reference worst case C/I, $(C/I)_{refl}$, because of the reduced number of interference sources each contributing to the interference phenomenon an individual share of the same order of magnitude. In fact, in the FIG. 5 configuration the number of dominant interference sources of the same order of magnitude is equal to two whereas in the FIG. 4 reference configuration the number of dominant interference sources of the same order of magnitude is equal to six.

The C/I performance has therefore been significantly improved in the central zone of each reception spot by scheduling the frequency resources on the basis of a geographical criterion for the position of the terminals and structuring each central inner zone in a cellular pattern of distribution of the principal sub-bands, thereby forming in each central zone a bundle of principal sub-bands. This scheduling and re-use of the frequencies makes it possible to increase C/I and consequently to enlarge the central inner zone of each reception spot on the basis of a C/I criterion.

Figure 6:
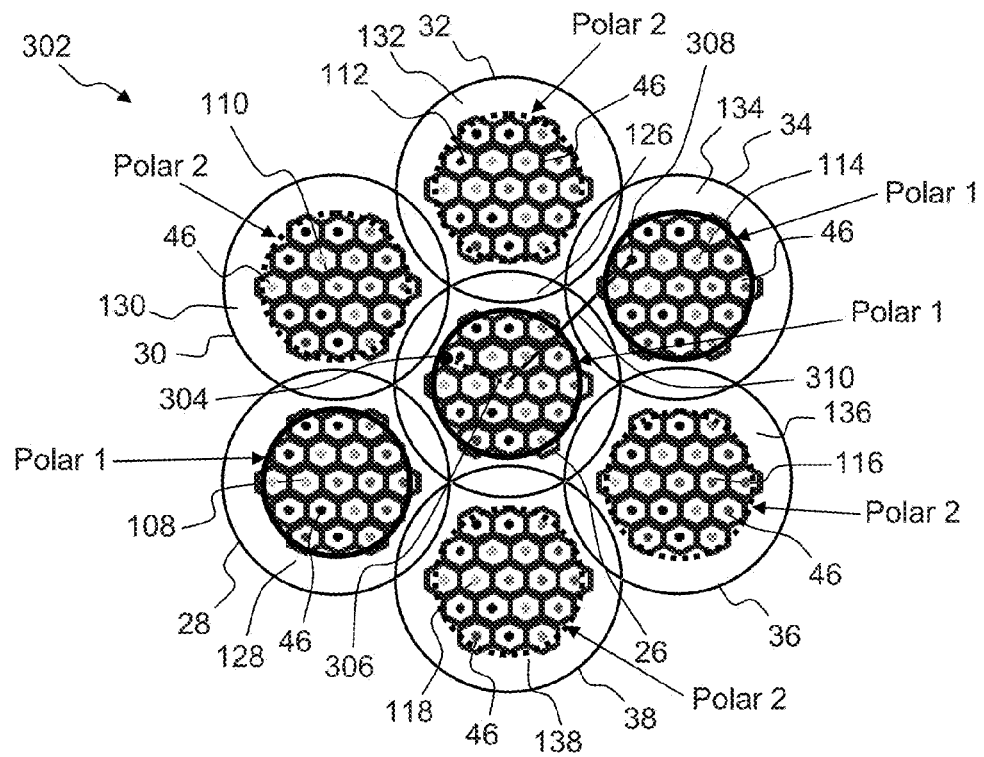
FIG. 6 shows a geographical frequency re-use scheme in accordance with a second embodiment of the invention with re-use of two polarization states and an example of a worst case configuration in terms of C/I.

In FIG. 6 and in accordance with an uplink frequency re-use plan 302 in accordance with a second embodiment of the invention, a partial view of this uplink frequency resource allocation plan 302 is shown by the same set 24 of reception spots 26, 28, 30, 32, 34, 36, 38 shown in FIGS. 1 and 2.

The uplink frequency re-use plan 302 is based on the re-use plan 102 of the first embodiment shown in FIGS. 2, 3 and 5 and differs therefrom only in the addition of a supplementary dimension, i.e. the polarization states.

As shown in FIG. 6, the frequency re-use plan 102 in accordance with the first embodiment of the invention is represented in exactly the same manner as in FIG. 2 except that the four-colour secondary sub-bands scheme is not shown for reasons of the legibility of FIG. 6.

In accordance with the transmission resource allocation plan 302, a third whole number n3, here equal to 2, of different polarizations, here the left circular polarization and the right circular polarization, respectively designated Polar 1 and Polar 2 in FIG. 6, and forming a set of two distinct polarization states, are distributed across all of the reception spots 26, 28, 30, 32, 34, 36, 38 and superposed in accordance with a two-colour polarization distribution scheme on the coloured principal and secondary frequency sub-band geographical allocation and re-use map. In the central reception spot 26, the first polarization Polar 1 is combined with the use of all the principal sub-bands BP1 to BP19 distributed in the cellular pattern 46 and of the secondary sub-band BS1 in the peripheral zone 126. In the reception spot 28, the first polarization Polar 1 is combined with the use of all of the principal sub-bands BP1 to BP19 distributed in the cellular pattern 46 and of the secondary sub-band BS3 in the peripheral zone 128. In the reception spot 34, the first polarization Polar 1 is combined with the use of all the principal sub-bands BP1 to BP19 distributed in the cellular pattern 146 and of the secondary sub-band BS3 in the peripheral zone 134. In the reception spot 30, the second polarization Polar 2 is combined with the use of all of the principal sub-bands BP1 to BP19 distributed in the cellular pattern 46 and of the secondary sub-band BS2 in the peripheral zone 130. In the reception spot 32, the second polarization Polar 2 is combined with the use of all of the principal sub-bands BP1 to BP19 distributed in the cellular pattern 46 and of the secondary sub-band BS4 in the peripheral zone 132. In the reception spot 36, the second polarization Polar 2 is combined with the use of all of the principal sub-bands BP1 to BP19 distributed in the cellular pattern 46 and of the secondary sub-band BS2 in the peripheral zone 136. In the reception spot 38, the second polarization Polar 2 is combined with the use of all of the principal sub-bands BP1 to BP19 distributed in the cellular pattern 46 and of the secondary sub-band BS2 in the peripheral zone 138. Note that the distribution of the two polarizations across all of the reception spots traces out a pattern of diagonal polarization lines in FIG. 6 alternating the polarization states.

To implement the plan 302, the uplink transmission resource scheduler and allocator 18, shown in FIG. 1, is configured to allocate a transmitter terminal on demand an uplink transmission resource in terms of a frequency sub-band and a polarization as a function of the geographical position of the transmitter terminal and the transmission resource allocation plan 302.

As shown in FIG. 6, the worst case ratio C/I for the frequency re-use plan 302 in accordance with the invention is observed when the required payload signal is transmitted from a third terminal, located at the edge of the inner zone 106 of the central reception spot 26 in cell number 4 of the cellular pattern and at the end 304 of a first directivity segment 306, for example, and the interference signal results for the most part from the contribution of a single interference source consisting of a terminal transmitting the same frequency, here the sub-band BP4, and located at the edge of the central zone 114 of the adjacent reception spot 34 in the cell 4 of the cellular pattern at the end 308 of a directivity segment 310. This worst case C/I is 8 dB higher than the reference worst case C/I, $(C/I)_{refl}$, because of a reduction in the number of interference sources each contributing to the interference phenomenon with the same order of magnitude.

In the FIG. 6 configuration, the number of dominant interference sources of the same order of magnitude is equal to one whereas in the first reference configuration from FIG. 4 the number of dominant interference sources of the same order of magnitude is equal to six.

The FIG. 6 configuration 302 therefore improves the C/I performance in the central inner zone of each reception spot more than the FIG. 5 configuration 102 thanks to the conjoint scheduling of transmission resources in terms of frequencies and polarization states based on a geographical criterion for the position of the terminals and structuring each central inner zone in a cellular pattern of distribution of principal sub-bands that form in each central zone a bundle of distributed principal sub-bands, the creation of an additional dimension, i.e. a multiplicity of polarization states, and the geographical re-use of these various polarization states.

This scheduling and re-use of the frequencies therefore makes it possible to obtain an improvement in C/I and consequently to enlarge the central inner zone of each reception spot on the basis of a C/I criterion.

The uplink transmission resource scheduler and allocator is generally configured to allocate a transmitter terminal on demand an uplink transmission resource in terms of a frequency sub-band and a polarization as a function of the geographical position of the transmitter terminal and a transmission resource allocation plan in accordance with which a third whole number n3, greater than or equal to 2, of different polarizations forming a set of polarization states are distributed across all of the reception spots and are superposed in accordance with a multicolour distribution scheme with n3 polarization colours on the coloured geographical allocation map of the sub-bands of frequencies.

Figure 7:
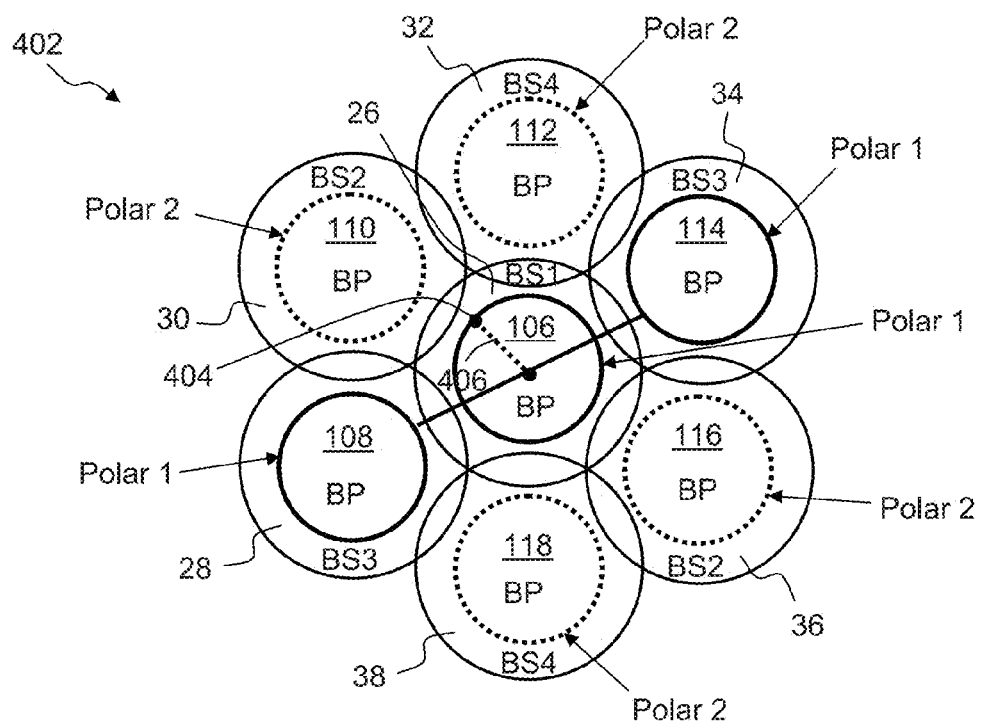
FIG. 7 shows a second prior art geographical frequency re-use scheme without re-use of polarization states serving as second reference in the evaluation of the transmission performance of a frequency re-use scheme in accordance with the invention and an example of a second reference worst case configuration in terms of C/I.

As shown in FIG. 7, a second reference configuration of a prior art transmission resource allocation plan 402 improves the performance in terms of transmission capacity of the first reference configuration of the prior art transmission resource allocation plan 202 shown in FIG. 4 and serves as second reference for evaluating the improvement of the transmission capacity of the system via the C/I conferred by the frequency re-use plan 302 in accordance with a second embodiment of the invention from FIG. 6.

The second transmission resource allocation plan 402 serving as second reference differs from the second frequency re-use plan 302 in accordance with the invention from FIG. 6 by virtue of the absence of a cellular pattern with at least two cells, a fortiori 19 cells, of a non-continuous allocation of the principal band. Note that the scheme with four secondary sub-band colours is used in the second allocation plan 402 serving as second reference but is not shown here for reasons of the legibility of FIG. 7.

In accordance with the second reference second allocation plan 402 with no cellular sectorization, any frequency or sub-band of frequencies of the principal band BP may be used anywhere in the central inner zone of each reception spot, and in particular may be used anywhere in the inner border of the central inner zone of each reception spot, which is the opposite of the allocation plan 302 in accordance with the invention in which the use of a principal sub-band is constrained by the cellular pattern 146 of allocation of the principal sub-bands implemented in each central inner zone of the reception spots.

As shown in FIG. 7, the worst case ratio C/I for the second reference allocation plan 402 is observed when the required payload signal is transmitted from a fourth terminal located at the edge of the inner zone of the central reception spot and at an end 404 of a first directivity segment 406 in FIG. 7, for example, and the interference signal results from the contribution of two dominant interference sources of the same order of magnitude consisting of two terminals transmitting the same frequency with the same polarization as the fourth terminal, here the first polarization Polar 1, and located at the edges of the central inner zones 108, 114 of the adjacent reception spots 28, 34 at the ends 408, 410 of two directivity segments 412, 414. This worst case C/I is the second reference C/I, $(C/I)_{ref2}$, which is improved by the use of the second frequency re-use plan 302 from FIG. 6, which combines the re-use of frequencies by distribution of principal sub-bands in the same central inner zone cellular pattern and the re-use of polarization states at the reception spots in accordance with a multicolour scheme.

The worst case C/I of the second frequency re-use plan 302 from FIG. 6 is 3 dB higher than the worst case C/I, $(C/I)_{ref2}$, of the second reference allocation plan 402 because of the structuring of each inner zone in a cellular pattern and 8 dB higher than the worst case scenario C/I, $(C/I)_{ref1}$, of the first reference first allocation plan 202 because of the conjoint effects of structuring each inner zone in a cellular pattern and the re-use of multiple polarization states.

The C/I performance has therefore been improved again and significantly in the central zone of each reception spot by scheduling the frequency resources on the basis of a geographical criterion for the position of the terminals and structuring each central zone in a cellular pattern of distribution of sub-bands, thus forming a bundle of sub-bands in each central zone. This scheduling and re-use of the frequencies makes it possible to obtain an improvement in C/I and consequently to enlarge the central zone of each reception spot on the basis of a C/I criterion.

Note that in all the embodiments of the invention described above the receive antenna is configured to form reception spots each illuminated in accordance with a Gaussian law and each having at its edge a roll-off greater than or equal to 7 dB. This results from the fact that the same reflector is used for the downlink on which the satellite transmits to the ground and for the channel on which the satellite receives signals sent from the ground. On the downlink this reflector is adapted to the transmission frequency so as to have a roll-off of 3 dB at the edge of the transmission spot and is over-dimensioned on the uplink because the reception frequency is higher than the transmission frequency. In the Ka band, for example, the transmission frequency is of the order of 20 GHz and the reception frequency is of the order of 30 GHz. Here, and in the opposite way to what is conventional, the uplink illumination law is not modified in order to obtain a roll-off of 3 dB at the reception spot edge. The result of this is a roll-off greater than or equal to 7 dB at the reception spot edge.

In the case of insufficient control of the attitude of the platform of the satellite, which can cause unacceptable depointing of the receive antenna of the satellite, an automatic system for correcting the depointing of the receive antenna could be used.

The geographical positioning means of each transmitter terminal are sufficiently precise to determine in which reception spot it is located, if it is located in an inner zone or in a peripheral zone of the spot, and in which cell it is located if it is located in an inner zone.

Variant allocation schemes are possible as a function of the local variability of the traffic, reflected in the local traffic density, and the temporal dynamic of the traffic over the coverage. For example, in a first case, the size of the central inner zone, representative of a scale factor, varies as a function of the reception spot and time. In a second case, the size of the central zone varies as a function of the reception spot and is independent of time. In a third case, the size of the central zone is constant and independent of the reception spot and time.

Figure 8:
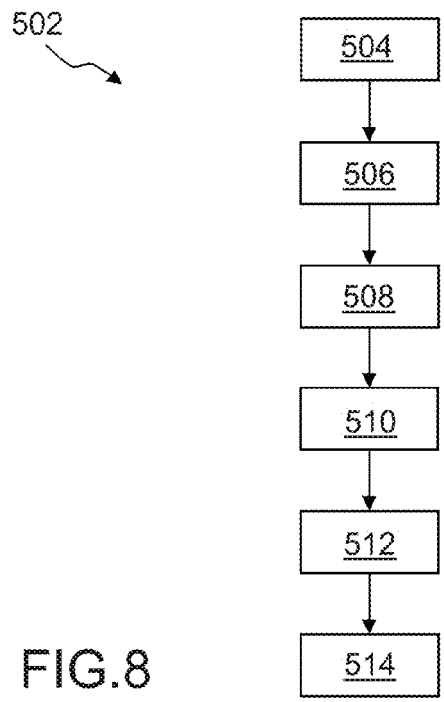
FIG. 8 is a flowchart of a frequency re-use method in accordance with a first embodiment of the invention without re-use of polarizations and with re-use of principal sub-bands in the inner zones of the reception spots.

As shown in FIG. 8 and in accordance with a first embodiment of the invention, a method 502 of complete or fractional re-use of frequencies from a total band BT allocated to an uplink is implemented in a satellite radiocommunication system such as that shown in FIG. 1.

The satellite radiocommunication system includes a satellite having a multi-beam receive antenna configured to form a set of at least two adjacent reception spots of a terrestrial coverage and a set of transmitter terminals distributed across all the spots, each terminal including geographical positioning means.

The frequency re-use method 502 comprises a set of steps executed successively.

In a first step 504, each reception spot is divided geographically into a central inner zone and a peripheral zone surrounding the central inner zone.

Then, in a second step 506, a principal band of frequencies is allocated to the inner zones of all the reception spots. The continuous or discontinuous principal band of frequencies forms a part of or the whole of the total band and it is shared in common by said inner zones.

Then, in a third step 508, the principal band is divided into a first bundle comprising a first number n1 greater than or equal to 2 of adjacent or separate principal sub-bands each of which is continuous.

In a fourth successive step 510, the central inner zone of each reception spot is divided, except for a scale factor representative of the size of the inner zone, into the same regular cellular pattern of cells in which the various principal sub-bands of the first bundle are unitarily distributed, the number of cells of the cellular pattern being equal to the first number n1 of principal sub-bands of the first bundle.

Then, in a fifth step 512, for each terminal from the area of the coverage that requires a transmission resource, it is determined in which spot the terminal is located, if it is located in an inner zone or in a peripheral zone, and in which cell it is located if the terminal is located in an inner zone.

Then, in a sixth step 514, the principal sub-band that has been allocated during the fourth step 510 to the cell of the reception spot in which the terminal is located is allocated to the transmitter terminal.

Figure 9:
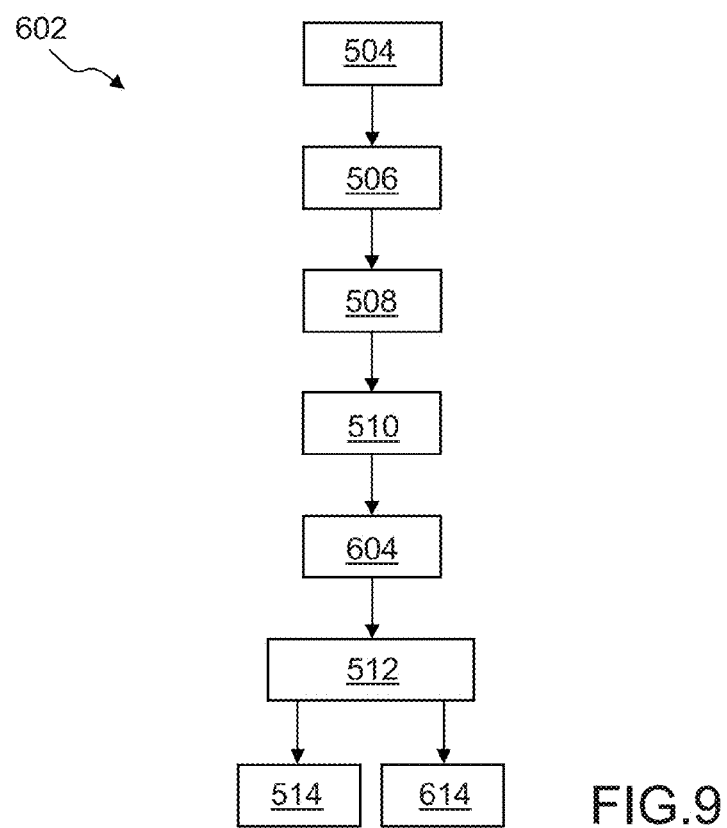
FIG. 9 is a flowchart of a frequency re-use method in accordance with a second embodiment of the invention without re-use of polarizations or polarization states and with re-use of principal sub-bands in the inner zones and of secondary sub-bands in the peripheral zones of the reception spots.

As shown in FIG. 9 and in accordance with a second embodiment of the invention, a method 602 of fractional re-use of frequencies from a total band allocated to an uplink is a variant of the first embodiment 502 of the frequency re-use method from FIG. 8 in which a seventh step 604 has been added between the fourth step 510 and the fifth step 512 and an eighth step 614 has been added after the fifth step 512.

In the seventh step 604, assuming that the principal band BP of frequencies forms a part of the total band BT, the set BS of frequencies of the total band that are not part of the principal band is divided into a second bundle comprising a number n2 greater than or equal to 3 of separate or adjacent continuous secondary sub-bands that are distributed across all of the peripheral zones in accordance with a multicolour scheme with n2 colours.

In the eighth step 614, if it has been determined beforehand in the fifth step 512 that the terminal is located in a peripheral zone of a reception spot, the secondary sub-band that has been allocated to the peripheral zone of the reception spot in which the terminal is located during the seventh step 604 is allocated to the transmitter terminal.

Figure 10:
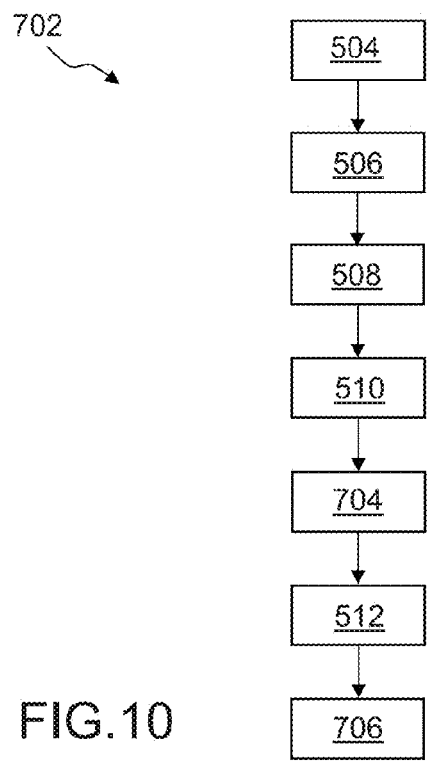
FIG. 10 is a flowchart of a frequency re-use method in accordance with a third embodiment of the invention with re-use of polarizations in the reception spots and with re-use of principal sub-bands in the inner zones of the reception spots.

As shown in FIG. 10 and in accordance with a third embodiment of the invention, a method 702 of complete or fractional re-use of frequencies from a total band allocated to an uplink is a variant of the first embodiment 502 of the re-use method shown in FIG. 8 in which the satellite is configured to detect also a third whole number n3, greater than or equal to 2, of polarizations forming a set of polarization states. Moreover, in this variant the transmitter terminals are configured to transmit at will and in a controlled manner with one of the n3 polarizations.

In accordance with the frequency re-use method 702, a ninth step 704 has been added between the step 510 and the step 512 and the sixth step 514 has been replaced by a tenth step 706.

In the ninth step 704, the n3 polarization states are distributed across all of the reception slots in accordance with a multicolour distribution scheme with n3 polarization colours superposed on the map of geographical allocation of the principal sub-bands.

The tenth step 706 is the sixth step 514 in which, for each terminal requiring a transmission resource formed of a frequency sub-band and a polarization, after it has been determined in which reception spot the transmitter terminal is located, the polarization that has been allocated to the reception spot in which the terminal is located is allocated to the terminal in addition to the principal sub-band that was allocated to it in the step 510.

In particular, the third whole number n3 is equal to 2, a first polarization being the right circular polarization and the second polarization being the left circular polarization.

Figure 11:
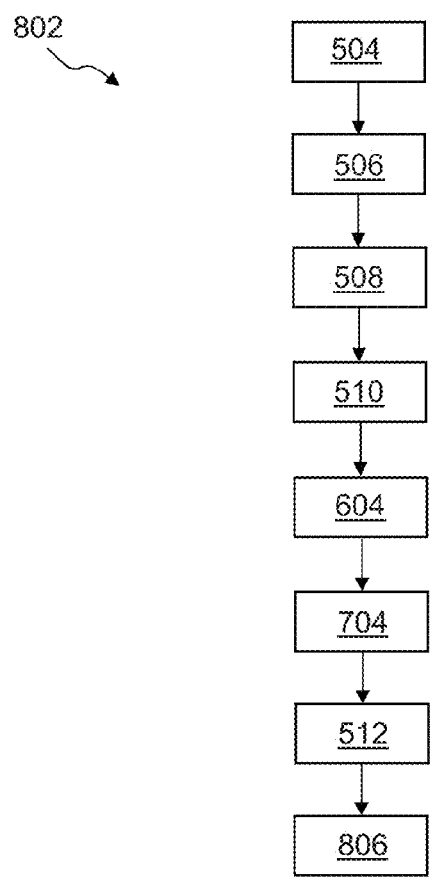
FIG. 11 is a flowchart of a frequency re-use method in accordance with a fourth embodiment of the invention with re-use of polarizations in the reception spots and with re-use of principal sub-bands in the inner zones and of secondary sub-bands in the peripheral zones of the reception spots.

As shown in FIG. 11 and in accordance with a variant of the method 702 from FIG. 10, a fourth embodiment of a frequency re-use method 810 comprising the same steps 504, 506, 508, 510, 704, 512, 706 of the method 702 further includes the step 604 of the method 602 from FIG. 9 inserted between the step 510 and the step 704 and a new step 806 at the exit from the fifth step 512 replacing the tenth step 706. In this new step 806, for each terminal requiring a transmission resource formed of a frequency sub-band and a polarization state, after it has been determined in which reception spot and in which zone the transmitter terminal is located, the polarization that has been allocated to the reception spot in which the terminal is located is allocated to the terminal in addition to the principal or secondary sub-band that was allocated to it in the step 510 or the step 604.

The satellite radiocommunication system and the frequency re-use method are configured for reception of the uplink by the satellite in a band included in the set of bands C, X, Ku, Ka, L, S, Q and V.

Static scheduling of the cellular pattern is the optimum for a system at maximum load.

If the systems are not loaded 100%, dynamic scheduling against a C/I criterion may be envisaged, notwithstanding that that optimum at a given time is not necessarily consistent with the next time and leads to complexity in the management of scheduling.

This limitation of the central zone prevents increasing the area of the central zone and increasing the capacity obtained via the FFR frequency re-use architectures.

The frequency re-use methods described above make it possible to increase the transmission capacity of a satellite and also the capacity density, i.e. the addressable bit rate per unit surface area.

The invention claimed is:

1. A broadband multi-beam satellite radiocommunication system configured for complete or fractional re-use of frequencies from a total band BT allocated to an uplink, comprising
a satellite having a multi-beam receive antenna configured to form a set of at least two adjacent reception spots of a terrestrial coverage; and
a set of transmitter terminals distributed across all of the spots, each terminal including geographical positioning means and means for transmission of an allocated transmission resource;
an uplink transmission resource scheduler and allocator, taking the form of one or more electronic computers, configured to allocate a transmitter terminal on demand an uplink transmission resource in terms of a frequency sub-band as a function of the geographical position of the transmitter terminal and a transmission resource allocation plan in accordance with which,
each reception spot consists of a central inner zone and a peripheral zone surrounding the central inner zone; and
the same continuous or discontinuous principal band BP of frequencies forming a part or the whole of the total band is allocated in its entirety to each central inner zone,
wherein
in accordance with the transmission resource allocation plan, the principal band BP is divided into a first bundle comprising a first whole number n1, greater than or equal to 2, of adjacent or separate principal sub-bands each of which is continuous; and
the central inner zone of each reception spot is divided, except for a scale factor representative of the size of the central inner zone, into the same regular cellular pattern of cells wherein the various principal sub-bands of the first bundle are unitarily distributed, the number of cells of the cellular pattern being equal to the first number n1 of principal sub-bands of the first bundle.

2. The multi-beam satellite radiocommunication system according to claim 1, wherein
in accordance with the transmission resource allocation plan,
the principal band BP of frequencies forms a part of the total band and the frequencies of the total band BT that are not part of the principal band BP form a continuous or discontinuous secondary band BS that is divided into a second bundle comprising a whole number n2, greater than or equal to 3, of separate or adjacent secondary sub-bands each of which is continuous, distributed across all of the peripheral zones of the reception spots in accordance with a multicolour scheme with n2 secondary sub-band colours.

3. The multi-beam satellite radiocommunication system according to claim 2, wherein the second number n2 of secondary sub-bands is a whole number included in the set of numbers 3, 4, 7 and 12.

4. The multi-beam satellite radiocommunication system according to claim 1, wherein
the cellular pattern is a pattern of cells of the same size and of triangular, square or hexagonal shape and/or
the number n1 of cells is between 2 and 19 inclusive.

5. The multi-beam satellite radiocommunication system according to claim 1, wherein
the uplink transmission resource scheduler and allocator is configured to allocate a transmitter terminal on demand an uplink transmission resource in terms of a frequency sub-band and a polarization as a function of the geographical position of the transmitter terminal and the resource allocation plan in accordance with which
a third whole number n3, greater than or equal to 2, of different polarizations forming a set of polarization states, are distributed across all of the reception spots and are superposed in accordance with a multicoloured distribution scheme with n3 polarization colours on the coloured geographical allocation map of the sub-bands of frequencies.

6. The multi-beam satellite radiocommunication system according to claim 5, wherein
the third number n3 of polarizations is equal to 2 and the polarizations of the pair are the left circular polarization and the right circular polarization or a first polarization with respect to a first axis and a second polarization with respect to a second axis orthogonal to the first axis.

7. The multi-beam satellite radiocommunication system according to claim 1, wherein
the receive antenna is configured to form reception spots each illuminated in accordance with a Gaussian law and each having at its edge a roll-off greater than or equal to 7 dB.

8. The multi-beam satellite radiocommunication system according to claim 1, further comprising an automatic system for correction of the depointing of the antenna notably caused by variations of attitude of the platform.

9. The multi-beam satellite radiocommunication system according to claim 1, further comprising
a set of transmitter terminals distributed across all of the spots and wherein each terminal includes geographical positioning means sufficiently precise to determine in which spot it is located, if it is located in an inner zone or in a peripheral zone, and in which cell it is located if it is located in an inner zone.

10. The multi-beam satellite radiocommunication system according to claim 1, wherein
the uplink transmission resource scheduler and allocator is distributed across all of the terminals and/or one or more auxiliary stations or is centralized in a station for controlling the resources and their scheduling.

11. The multi-beam satellite radiocommunication system according to claim 1, wherein the size of the central zone, representative of the scale factor, varies as a function of the reception spot and time.

12. The multi-beam satellite radiocommunication system according to claim 1, configured for reception of the uplink by the satellite in a band included in the set of bands C, X, Ku, Ka, L, S, Q and V.

13. A method of complete or fractional re-use of frequencies of a total band allocated to an uplink in a broadband multi-beam satellite radio communication system, the system including comprising
a satellite having a multi-beam receive antenna configured to form a set of at least two adjacent reception spots of a terrestrial coverage; and
a set of transmitter terminals distributed across all of the spots, each terminal including geographical positioning means; the method including comprising the steps consisting in of:
geographically dividing each reception spot into a central inner zone and a peripheral zone surrounding the central inner zone; then
allocating the inner zones of all the reception spots a continuous or discontinuous principal sub-band of frequencies forming a part or the whole of the total band, wherein the method further comprising
  dividing the principal band into a first bundle comprising a first number n1 greater than or equal to 2 of adjacent or separate principal sub-bands each of which is continuous; and
  dividing each central inner zone of a reception spot, except for a scale factor representative of the size of the inner zone, into the same cellular pattern of cells in which the various principal sub-bands of the first bundle are unitarily distributed, the number of cells of the cellular pattern being equal to the first number n1 of secondary sub-bands of the first bundle.

14. The method in accordance with claim 13 of complete or fractional re-use of frequencies, further comprising the steps of
  for each terminal requiring a transmission resource,
    determining in which spot it is located and if it is located in an inner zone or in a peripheral zone, and determining in which cell it is located if the terminal is located in an inner zone, and in this case
  allocating the terminal the sub-band that has been allocated to the cell of the reception spot in which the terminal is located.

15. The method according to claim 13 of frequency re-use wherein
  the principal band of frequencies forms a part of the total band and which further comprises the steps of
  dividing the frequencies of the total band that are not part of the principal band into a second bundle comprising a number n2 greater than or equal to 3 of separate or adjacent continuous secondary sub-bands distributed across all of the peripheral zones in accordance with a multicolour scheme with n2 secondary sub-band colours; and
  for each terminal requiring a transmission resource, after determining in which spot it is located and if it is located in an inner or peripheral zone, if the terminal is located in a peripheral zone, allocating the terminal the auxiliary sub-band that has been allocated to the peripheral zone of the reception spot in which the terminal is located.

16. The method according to claim 13 of frequency re-use, further comprising the steps of
  distributing across all of the reception spots a third whole number n3, greater than or equal to 2, of polarizations forming a set of polarization states, superposing sub-bands on the geographical allocation map in accordance with a multicolour distribution scheme with n3 polarization colours; and
  for each terminal requiring a transmission resource formed of a frequency sub-band and a polarization, after determining in which reception spot it is located, allocating the terminal the polarization that has been allocated to the reception spot in which the terminal is located, in addition to the sub-band that has been allocated to it in the step (510) or the step (604).

17. The method according to claim 13 of frequency re-use, wherein the size of the central zone varies as a function of the spot and time.

* * * * *